Patented Feb. 12, 1952

2,585,709

UNITED STATES PATENT OFFICE 2,585,709

1-METHYL-5-CHLOROBENZENE-2-THIOGLYCOLLIC ACID

Jesse Werner, Brooklyn, N. Y., and David E. Graham, Winfield, N. J., assignors to General Aniline & Film Corporation, New York, N. Y., a corporation of Delaware No Drawing. Application December 14, 1949, Serial No. 133,003

8 Claims. (Cl. 260—516)

This invention relates to a process for purifying 1-methyl-5-chlorobenzene - 2 - thioglycollic acid.

The use of vat colors for the dyeing and printing of textiles and as pigments is well known. This use generally requires a very high degree of light fastness. Although the thioindigo class of vat dyes is generally brighter than the anthraquinone and related classes of vat colors, it is generally poorer in fastness qualities, particularly the light fastness. These deficiencies apply to one of the most important red violet vat dyestuffs, namely 5,5'-dichloro-7,7'-dimethyl thioindigo, known in the trade as Indanthrene Red Violet RH (C. I. No. 1212). This is generally prepared from 1-methyl-5-chlorobenzene-2-thioglycollic acid by ring closure followed by oxidation according to the following reactions:

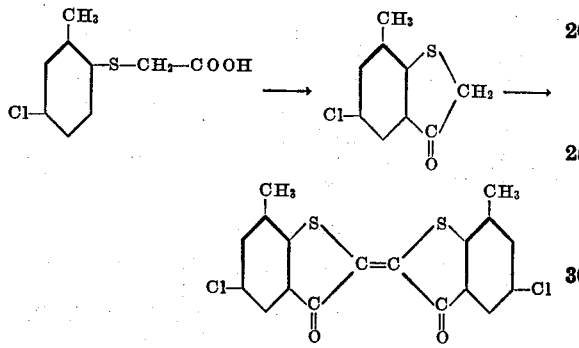

The tinctorial qualities, in particular the light fastness of the dyestuff, are to a large extent dependent upon the purity of the starting material, 1 - methyl-5-chlorobenzene-2-thioglycollic acid. A pure starting material free of isomeric compounds and other contaminants generally results in a superior dyestuff.

There are several useful methods for making 1-methyl-5-chlorobenzene-2-thioglycollic acid as illustrated by the following equations:

(1)

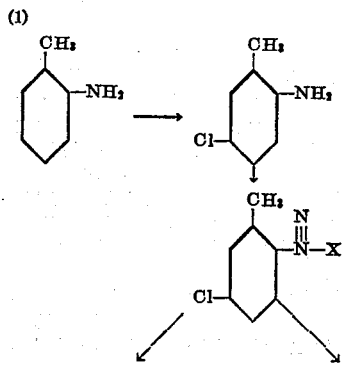

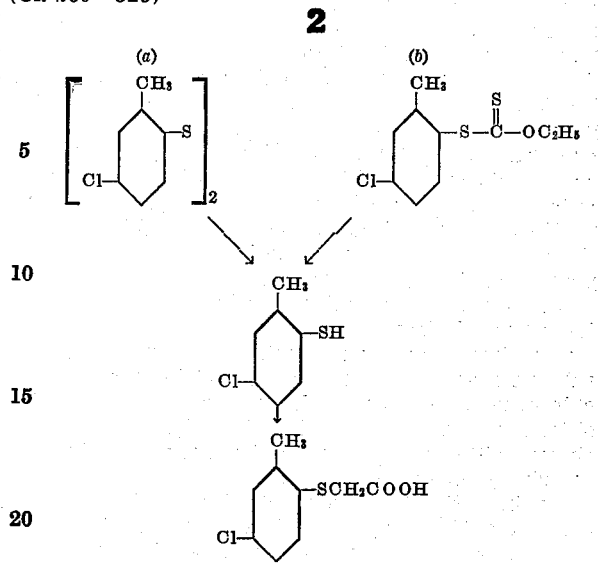

This method results in the formation of a considerable number of contaminants and isomeric compounds, including 1-methyl-3-chlorobenzene-2-thioglycollic acid, 1-methyl-3,5-dichlorobenzene-2-thioglycollic acid, sulfur compounds, chlorocresols, dichlorotoluene, etc.

(2)

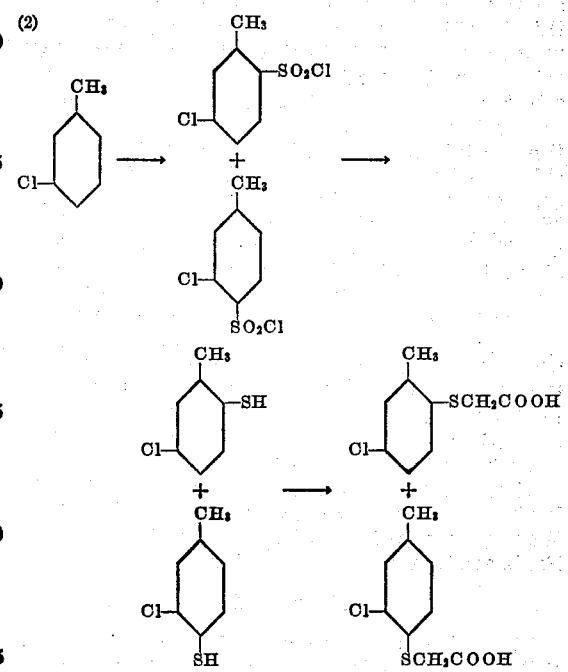

The principal contaminant, in addition to such sulfur compounds as sulfones, is 1-methyl-5- chlorobenzene-4-thioglycollic acid. This forms 7,7'-dichloro-5,5'-dimethyl-thioindigo on ring closure and oxidation. The presence of this isomeric dyestuff causes a deterioration of the tinctorial and fastness properties, in particular the light fastness.

The isomers and other impurities present in the commercially prepared 1-methyl-5-chlorobenzene-2-thioglycollic acid would obviously be detrimental to any process employing said acid as a starting material because of the tendency of undesirable side reactions involving these impurities to occur, particularly in the manufacture of Indanthrene Red Violet RH. The need to remove such impurities has been recognized but the usual prior art methods of removing such impurities from said crude acid are for the most part substantially ineffective. Such methods as disclosed, for example, in Patents 1,725,080, 1,897,516, 1,988,501 and 2,026,629 involve various procedures including recrystallization from water or organic solvents; solution in alkaline aqueous or organic media, with or without bone black; followed by filtration and then acidification to precipitate the desired compounds, etc. None of these methods has been found to produce a compound sufficiently free from impurities to provide a satisfactory intermediate for the purposes set forth hereinbefore.

The discovery of a new, economical, simple and efficient method of purifying crude 1-methyl-5-chlorobenzene-2-thioglycollic acid are among the objects and purposes of this invention. Other objects will become apparent from the following description of our invention.

Our invention is made possible by the discovery that in acidifying an alkaline solution of the crude 1-methyl-5-chlorobenzene-2-thioglycollic acid, that portion of the material precipitated between an upper pH limit of about 6.0 to 6.2 and a lower pH limit of about 4.0 to 5.8 will constitute substantially pure 1-methyl-5-chlorobenzene-2-thioglycollic acid.

This discovery is carried into effect by dissolving the crude 1-methyl-5-chlorobenzene-2-thioglycollic acid in at least a substantially equimolar amount of dilute alkali, treating this alkali solution with an adsorbing agent, adjusting the solution to a pH of about 6.0 to 6.2 with acid, separating out the adsorbing agent together with the precipitated contaminants, adjusting the resulting solution to a pH of about 4.0 to 5.8 and separating the material precipitated thereby. Material precipitated between the upper pH limit of about 6.0 to 6.2 and the lower pH limit of about 4.0 to 5.8 is substantially pure 1-methyl-5-chlorobenzene-2-thioglycollic acid and gives a dyestuff of considerably improved tinctorial and fastness qualities, in particular light fastness. The solution remaining after the separation of the 1-methyl-5-chlorobenzene-2-thioglycollic acid still contains various isomeric compounds and other contaminants which may be precipitated by further acidification.

The invention is further illustrated by the following examples, although it is to be understood that they are illustrative and not limitative. Parts are by weight unless otherwise specified.

*Example 1*

100 parts of a crude 1-methyl-5-chlorobenzene-2-thioglycollic acid, melting at 120–122° C., prepared according to the method illustrated in the previous series of Equations (1) (a) (as given in German Patent 499,151 (Friedländer 17,607) and U. S. Patent 1,706,489) is dissolved in 1000 parts of water by addition of about 40 parts of 50% sodium hydroxide solution till just alkaline.

The mixture is stirred to effect solution and 5 parts of nuchar is added. The pH is adjusted to 6.0–6.2 by addition of hydrochloric acid and the solution stirred for a while until the pH remains constant. It is filtered and the nuchar cake containing some of the impurities washed with a little water. The combined filtrate and wash is then brought to a pH of 4.0 by slow addition of hydrochloric acid during which time the pure 1-methyl-5-chlorobenzene-2-thioglycollic acid is precipitated. The mixture is stirred for several hours until the pH remains constant at 4.0. It is filtered and the filter cake is washed with 500 parts cold water. The cake is pressed out well and dried.

Yield=87 parts, 87% recovery of pure 1-methyl-5-chlorobenzene-2-thioglycollic acid of M. P. 126–127° C. which can be converted to an Ind. Red Violet RH of light fastness superior to that of Ind. Red Violet RH made from the starting material.

*Example 2*

The process described in Example 1 is used on 100 parts of crude 1-methyl-5-chlorobenzene-2-thioglycollic acid prepared according to the method illustrated in the previous series of Equations (1) (b). This procedure is described in German Patent 245,631 (Friedländer 10,497). The pure material is obtained by isolation of the material precipitating between the pH range 6.2 and 4.5 as described in the previous example.

Yield=93% recovery of pure 1-methyl-5-chlorobenzene-2-thioglycollic acid of similar quality to that obtained in the previous example.

In both Examples 1 and 2, further acidification of the filtrate and wash from the filtration of the pure material gives an oily precipitate which contains isomeric chlorotoluene thioglycollic acids and chloro cresols.

*Example 3*

100 parts of crude 1-methyl-5-chlorobenzene-2-thioglycollic acid melting at 119–121° C., and made according to the method illustrated in the previous series of Equations (2) (which is described in British Patent 281,290, is dissolved in 1900 parts of water by the addition of about 27 parts of sodium carbonate until alkaline.

The mixture is stirred for several hours to dissolve and 10 parts nuchar added. The pH is adjusted to 6.2 by addition of dilute sulfuric acid and stirred until pH remains constant at 6.2. The clarified solution is filtered from the nuchar cake which now contains some of the impurities and the cake is washed with a little water. The combined filtrate and wash is brought to a pH of 5.8 by slow addition of dilute sulfuric acid during which addition the 1-methyl-5-chlorobenzene-2-thioglycollic acid is precipitated. After holding at a constant pH of 5.8 the mixture is filtered and the cake is washed with 200 parts of water and pressed out well. It is dried to give a 52% recovery of a purified 1-methyl-5-chlorobenzene-2-thioglycollic acid of M. P. 123–124° C. which can be converted to an Ind. Red Violet RH of better light fastness quality than that made from the starting crude 1-methyl-5-chlorobenzene-2-thioglycollic acid. Further acidification of the filtrate from this purification yields a mixture of isomeric chloro toluene thioglycollic acids of M. P. 113–114° C. which gives an Ind. Red Violet RH of inferior quality particularly in light fastness.

The processes as described hereinbefore may be modified and/or adjusted as appears hereinafter.

It will, of course, be understood that the particular and critical pH limits to be employed in any specific instance for precipitation of a 1-methyl-5-chlorobenzene-2-thioglycollic acid which is substantially free from isomeric and other contaminants depends upon the source of the crude materials and other factors. Thus, extension of the pH range in which the 1-methyl-5-chlorobenzene-2-thioglycollic acid is separated, by adjustment of the lower pH limit towards the 4.0 minimum value, will tend to increase the yield of 1-methyl-5-chlorobenzene-2-thioglycollic acid but, at the same time, the possibility of entrainment of precipitated impurities is increased. For most purposes, a lower pH limit of about 4.0 to 4.5 is satisfactory.

As starting material there may be used a solution of a water-soluble salt of the crude 1-methyl-5-chlorobenzene-2-thioglycollic acid directly as obtained in the manufacture of this intermediate or a suspension of the crude thioglycollic acid obtained in this manner. The concentration of the solution of the water-soluble salt of the crude thioglycollic acid may range from under ten percent to above twenty percent, only being limited by the solubilities of said salt and of the finally isolated thioglycollic acid.

Instead of the sodium hydroxide and sodium carbonate employed in the examples, any alkali which gives a water-soluble salt of the thioglycollic acid may be used to neutralize and dissolve the crude 1-methyl-5-chlorobenzene-2-thioglycollic acid. Thus, there may be used the alkali and alkaline earth metal and ammonium hydroxides, and their salts with weak acids. Excess alkali may be used but may not be economically desirable.

Any water-soluble acidic material may be used to acidify the alkaline solution provided it does not decompose the 1-methyl-5-chlorobenzene-2-thioglycollic acid or operate to precipitate impurities within the critical pH range. Thus, in addition to the hydrochloric and sulfuric acids employed in the examples, there may be employed acetic acid, phosphoric acid and salts of the aforementioned acids with weak alkalies in any concentration consistent with the total volume employed.

The method of separating the precipitated materials from the solutions is of course immaterial. Filtration is usual but other methods such as decantation, use of separatory devices, suction or centrifugation may be employed.

The use of adsorbing agents in the alkaline solution is important in obtaining the most desirable results. Activated carbon is preferred. The term "activated carbon" is intended to include any adsorbent carbonaceous material, whether produced from animal, vegetable, mineral or synthetic sources. However, any other inert adsorbing agent may be used, natural or synthetic, organic or inorganic. For example, there may also be employed any of the diatomaceous earths, bleaching clays, such as fuller's earth, bentonite and bauxite, silica gels, activated aluminas, inorganic and organic zeolites, certain metallic oxides, acids and salts, and similar materials functioning in the desired manner.

Our invention has been described with respect to certain preferred embodiments thereof but various modifications and variations within the spirit and scope of the invention will become apparent to those skilled in the art. It is accordingly understood that such modifications and variations are to be considered as within the purview of this application and the scope of the appended claims.

We claim:

1. In a process for purifying crude 1-methyl-5-chlorobenzene-2-thioglycollic acid, the steps of acidifying an alkaline solution of said crude acid to a pH of about 6.0 to 6.2, separating out the precipitated material, acidifying the solution further to a pH of about 4.0 to 5.8 and recovering the newly precipitated material which consists of substantially pure 1-methyl-5-chlorobenzene-2-thioglycollic acid.

2. In a process for purifying crude 1-methyl-5-chlorobenzene-2-thioglycollic acid, the steps of acidifying an alkaline solution of said crude acid, said solution containing an adsorbing agent, to a pH of about 6.0 to 6.2, separating out the adsorbing agent and precipitated material, acidifying the solution further to a pH of about 4.0 to 5.8 and recovering the newly precipitated material which consists of substantially pure 1-methyl-5-chlorobenzene-2-thioglycollic acid.

3. A process comprising dissolving crude 1-methyl-5-chlorobenzene-2-thioglycollic acid in an aqueous solution containing at least a substantially equimolar amount of an alkali selected from the group consisting of sodium hydroxide and sodium carbonate, adding an adsorbing agent, acidifying the solution to a pH of about 6.0 to 6.2, separating out the adsorbing agent and precipitated material, acidifying the solution further to a pH of about 4.0 to 5.8 and recovering the newly precipitated material which consists of substantially pure 1-methyl-5-chlorobenzene-2-thioglycollic acid.

4. A process comprising dissolving crude 1-methyl-5-chlorobenzene-2-thioglycollic acid in an aqueous solution containing at least a substantially equimolar amount of alkali, adding an adsorbing agent, acidifying the solution to a pH of about 6.0 to 6.2, separating out the adsorbing agent and precipitated material, acidifying the solution further to a pH of about 4.0 to 5.8 and recovering the newly precipitated material which consists of substantially pure 1-methyl-5-chlorobenene-2-thioglycollic acid, the acidifying substance being selected from the group consisting of hydrochloric and sulfuric acids.

5. A process comprising dissolving crude 1-methyl-5-chlorobenzene-2-thioglycollic acid in an aqueous solution containing at least a substantially equimolar amount of an alkali selected from the group consisting of sodium hydroxide and sodium carbonate, adding an adsorbing agent, acidifying the solution to a pH of about 6.0 to 6.2, separating out the adsorbing agent and precipitated material, acidifying the solution further to a pH of about 4.0 to 5.8 and recovering the newly precipitated material which consists of substantially pure 1-methyl-5-chlorobenzene-2-thioglycollic acid, the acidifying substance being selected from the group consisting of hydrochloric and sulfuric acids.

6. A process comprising dissolving crude 1-methyl-5-chlorobenzene-2-thioglycollic acid in an aqueous solution containing at least a substantially equimolar amount of sodium hydroxide, adding activated carbon, acidifying the solution with hydrochloric acid to a pH of about 6.0 to 6.2, separating out the activated carbon and precipitated material, acidifying the solution further with hydrochloric acid to a pH of about 4.0 and recovering the newly precipitated material, which consists of substantially pure 1-methyl-5-chlorobenzene-2-thioglycollic acid.

7. A process comprising dissolving crude 1-methyl-5-chlorobenzene-2-thioglycollic acid in an aqueous solution containing at least a substantially equimolar amount of sodium hydroxide, adding activated carbon, acidifying the solution with hydrochloric acid to a pH of about 6.0 to 6.2, separating out the activated carbon and precipitated material, acidifying the solution further with hydrochloric acid to a pH of about 4.5 and recovering the newly precipitated material, which consists of substantially pure 1-methyl-5-chlorobenzene-2-thioglycollic acid.

8. A process comprising dissolving crude 1-methyl-5-chlorobenzene-2-thioglycollic acid in an aqueous solution containing at least a substantially equimolar amount of sodium carbonate, adding activated carbon, acidifying the solution with sulfuric acid to a pH of about 6.2, separating out the activated carbon and precipitated material, acidifying the solution further with sulfuric acid to a pH of about 5.8 and recovering the newly precipitated material, which consists of substantially pure 1-methyl-5-chlorobenzene-2-thioglycollic acid.

JESSE WERNER.
DAVID E. GRAHAM.

REFERENCES CITED

The following references are of record in the file of this patent:

UNITED STATES PATENTS

| Number | Name | Date |
| --- | --- | --- |
| 1,862,594 | Herz et al. | June 14, 1932 |
| 1,897,516 | Herz et al. | Feb. 14, 1933 |
| 1,988,501 | Lubs et al. | Jan. 22, 1935 |
| 2,017,613 | Veraguth et al. | Oct. 15, 1935 |
| 2,061,186 | Cole | Nov. 17, 1936 |

OTHER REFERENCES

Findlay, "Introduction to Physical Chem." (Longmans), pp. 456–457 (1933).